Figure 1:
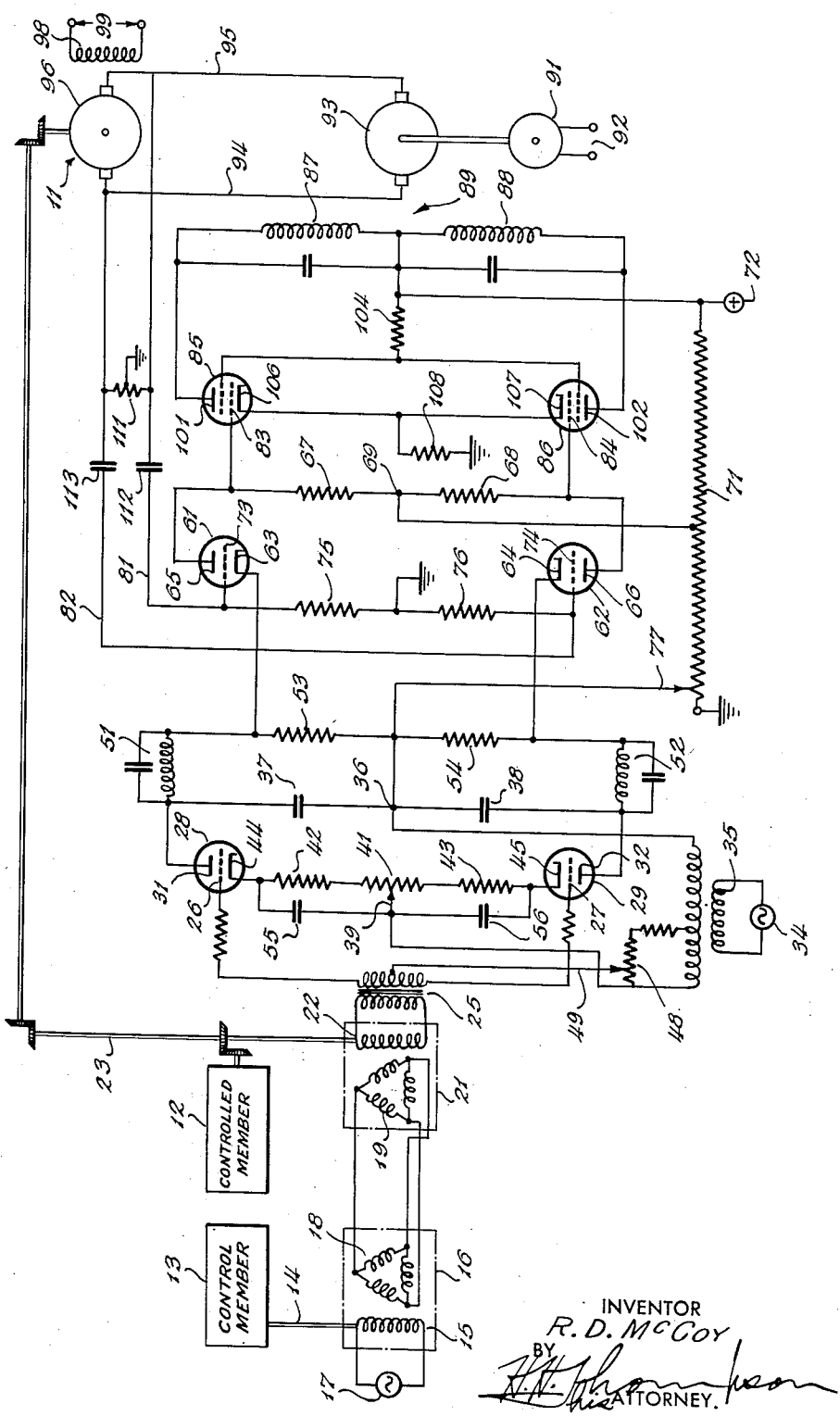

Aug. 9, 1949.                    R. D. McCOY                    2,478,203
                        FOLLOW-UP MOTOR CONTROL CIRCUIT
Filed April 8, 1944                                          2 Sheets-Sheet 1

INVENTOR
R. D. McCOY
BY
H. H. Thompson
his ATTORNEY.

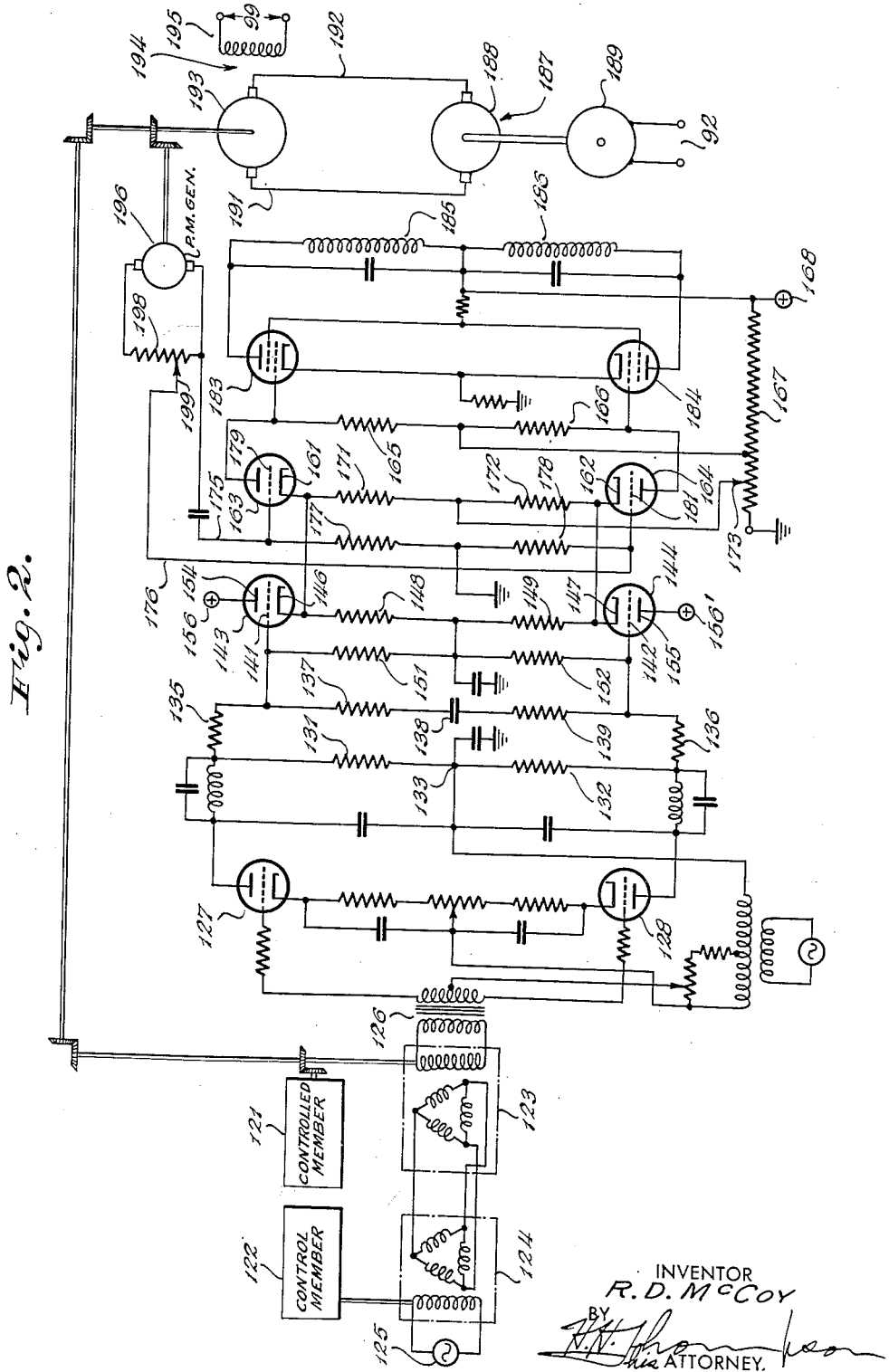

Patented Aug. 9, 1949

2,478,203

UNITED STATES PATENT OFFICE 2,478,203

FOLLOW-UP MOTOR CONTROL CIRCUIT

Rawley D. McCoy, Bronxville, N. Y., assignor to The Sperry Corporation, a corporation of Delaware Application April 8, 1944, Serial No. 530,227

14 Claims. (Cl. 318—30)

This invention relates to motor control circuits and, particularly, concerns positional or velocity control systems in which a pair of control signals are combined to jointly control operation of a motor.

An object of the invention is to provide an amplifier for mixing and amplifying two independent signals to control the operation of a motor.

Another object of the invention is to provide a balanced mixer amplifier circuit for combining two signals to control a motor according to the algebraic sum or difference of the signals.

A further object of the invention is to provide a motor control circuit with a balanced signal mixing network in which one signal is applied to the cathodes and another signal to the control grids of a pair of electron discharge devices arranged in balanced circuit.

A still further object of the invention is to provide a balanced mixer amplifier in a motor control circuit which may be connected to two high impedance signal sources.

Other objects and advantages of this invention will become apparent from the specification, taken in connection with the accompanying drawing wherein:

Fig. 1 is a schematic wiring diagram of a positional control circuit embodying the invention; and Fig. 2 is a schematic wiring diagram of a positional control system embodying the invention in a modified form.

According to the invention in its preferred form a pair of electron discharge tubes, each including at least three electrodes, are connected in a balanced circuit with suitable impedances in the form of resistances connected between corresponding electrodes of each of the tubes and balanced relative to a neutral point of the circuit which may be grounded. A first control signal, for example, the error signal in a positional control system, is used to differentially adjust the potentials of the cathodes of the electron discharge devices, and a second signal, which may be developed according to the speed of the controlled motor, is used to differentially adjust the potentials of the grids of the tubes. The potential between the grid and cathode circuits is adjusted to bias the individual tubes in a manner such that their respective space currents are substantially proportional to the algebraic difference between the differentially applied signals. The difference between the space currents of the two tubes controls a balanced power amplifier circuit which adjusts the field currents in opposing fields of a generator to control the voltage applied to a motor, and thereby control the speed of the motor according to the algebraic difference of the signals. In a modified form of the invention, a mixer amplifier circuit is provided with two high impedance inputs for the pair of control signals by applying the first control signal to a cathode follower circuit which adjusts the potential of the cathode of the mixer tubes according to the first signal.

Referring now to the specific embodiments of the invention shown in the drawings, Fig. 1 shows a positional control system for operating a motor 11 to position a controlled member 12 according to or synchronously with the position of a control member 13. The control member 13 is connected as by shaft 14 to position rotor 15 of a conventional synchro-transformer 16 which may be of the "Selsyn," "Telegon" or "Autosyn" type well known in the art.

The rotor winding 15 is energized by a suitable source of alternating current 17, and induces a voltage in polyphase stator winding 18 which is connected to a corresponding polyphase winding 19 of a second synchro-transformer 21, having a rotor winding 22 positioned as by shaft 23 according to the position of the controlled member 12. As is well known in this type of transmission system a reversible phase variable magnitude error voltage induced in the rotor winding 22 depending upon the direction and magnitude of the relative displacements of the two rotor windings 15 and 22 from their synchronous position, which corresponds to the positional displacement between the controlled and control members 12 and 13 respectively. In the system shown, only a single transmission channel is used. However, it will be apparent that a suitable coarse and fine system may be adapted to obtain greater precision if desired.

This reversible phase variable magnitude alternating voltage may be coupled as by a transformer 25 to be applied in phase opposition to grids 26 and 27 of a pair of triodes 28 and 29 which are connected in a well-known balanced demodulator circuit. An alternating voltage is applied to plates 31 and 32 of the tubes 28 and 29 from a source 34 which may be the same as, or synchronized with, the source 17. Voltage from the source 34 is supplied as by transformer 35 to a center point 36 between condensers 37 and 38 which are connected to the plates 31 and 32 and by slider 39 to a variable point on resistor 41 as well as cathode resistors 42 and 43 to cathodes 44 and 45 of the tubes 28 and 29. The slider 39 may be adjusted to properly balance the circuit. To provide a suitable bias for the tubes 28 and 29 a potentiometer 48 is connected across a portion of the secondary winding of transformer 35 and has its slider connected as by lead 49 to the center point of the secondary of transformer 25 in a manner such that an appropriate bias is applied to the grids 26 and 27 for those half cycles during which a positive voltage is applied to the plates 31 and 32.

With the circuit above described the unidirectional component of the potential difference of plates 31 and 32, which are connected through filter circuits 51 and 52 and load resistors 53 and 54 to the center point 36, is proportional to the error signal from the rotor winding 22. In systems of this type, it is usually also desirable to modify this error signal according to its rate of change. One arrangement for introducing a rate component is by connecting condensers 55 and 56 across cathode resistors 42 and 43. By appropriately selecting values of these condensers and resistors, that is, a large capacity condenser as compared to the resistance of the resistors, the unidirectional component of the potential of plates 31 and 32 will be dependent upon the error signal as well as its rate of change and may be referred to as a composite signal including both displacement and rate components.

It will be apparent from this description that filters 51 and 52 will pass only the unidirectional component of the space current of the tubes 28 and 29, and the voltage across load resistors 53 and 54 will be a substantially pure unidirectional voltage that is proportional to the composite error and error rate signals.

The mixer amplifier circuit, which forms an important feature of the present invention, consists of a pair of electron discharge tubes 61 and 62 arranged in a balanced circuit with their cathodes 63 and 64 connected across load resistors 53 and 54 to control the potentials of these cathodes according to the unidirectional potential of plates 31 and 32 of the demodulator circuit. During quiescent conditions, the cathodes 63 and 64 will be at the same positive potential but will change differentially, that is, one will become more positive and the other less positive, when an error signal is applied from rotor winding 22.

Plates 65 and 66 of the mixer amplifier tubes 61 and 62 may be connected through suitable load resistors 67 and 68 to a center point 69 which is connected to a selected point on voltage divider 71 connected across a source of unidirectional potential 72 to ground. Grids 73 and 74 of the mixer amplifier tubes 61 and 62 are connected through conventional grid resistors 75 and 76 to ground. The center point between load resistors 53 and 54, which is the center point of the normal voltage applied to cathodes 63 and 64, is connected by an adjustable slider 77 to a point on the voltage divider 71 to apply a small positive potential to cathodes 63 and 64 to bias the tubes 61 and 62 so they will be normally operating on a linear portion of their mutual characteristic curves.

As will become apparent from the following description, a second control signal in the form of a velocity signal is connected by leads 81 and 82 to grids 73 and 74 for differentially varying the potential of these grids, by changing one positively and the other negatively with respect to ground depending upon the desired effect of the signal.

Since the tubes 61 and 62 are biased to operate on the linear portion of their characteristic curves, changes in their respective space currents will be substantially proportional to changes in the voltage between their grids and cathodes, since the plate voltage is maintained substantially constant. Also, the space currents in these tubes will be equal under quiescent conditions. When the potentials of the grids and cathodes are varied differentially, the space currents will likewise vary differentially, and the difference between the space currents will be proportional to the algebraic difference between the differential potentials applied to the cathodes and the grids corresponding to the error signal and the speed or velocity signal, respectively.

This difference in space currents will develop a differential voltage across load resistors 67 and 68 which may be applied to grids 83 and 84 of power amplifier tubes 85 and 86 that are also arranged in a balanced circuit having their plates connected through opposing field windings 87 and 88 of a D. C. generator 89. The generator 89 is connected in a variable speed drive, known as a Ward-Leonard type, that includes a constant speed motor 91 energized from any suitable source 92 for driving armature 93 of the generator 89. The voltage generated in armature 93 is connected as by leads 94 and 95 to an armature 96 of a D. C. motor 11, having its field 98 connected to a constant source 99.

The plates 101 and 102 of the tubes 85 and 86 are connected through the field windings 87 and 88 to the source of positive potential 72. This source is also connected through a dropping resistor 104 to the screen grid of the tubes 85 and 86 and cathodes 106 and 107 of these tubes are connected through a common cathode resistor 108 to ground.

Since the potentials of control grids 83 and 84 are varied differentially according to the composite error and velocity signals, the space currents in these tubes are likewise varied differentially so the resultant field of opposed windings 87 and 88 causes the generator 93 to produce a voltage of a polarity and magnitude corresponding to the composite signals. This voltage is applied to the armature 96 of the motor 11 to drive the motor at a rate dependent on the composite signal and in a direction dependent upon the polarity sense of the voltage.

Since the voltage applied to the armature 96 is substantially proportional to the speed of the motor this voltage may be used as a velocity signal to be applied to the grids 73 and 74 of the mixer amplifier tubes. A suitable resistor 111 having its center point connected to ground is connected across leads 94 and 95 so the voltage across this resistor will vary differentially with respect to ground according to the velocity of motor 11. This differential voltage is applied through condensers 112 and 113 and leads 81 and 82 to grids 73 and 74 of the mixer tubes 61 and 62 respectively. Condensers 112 and 113 are to block the unidirectional speed voltage except during changes in the velocity of the motor.

In the circuit shown in Fig. 1 and described above, the composite error and error rate signals from the balanced demodulator circuit normally control the motor to drive at a velocity proportional to the error and the rate of change of the error. In order to avoid "hunting" some velocity damping is desired. Hence the circuit shown drives the motor 11 at a velocity proportional to the difference between the voltage corresponding to the error and error rate applied to the cathodes and the velocity damping voltage applied to the grids 73 and 74. Since this damping is only necessary during accelerations of the motor 11, the condensers 112 and 113 serve to eliminate it during constant velocity periods. This type of velocity damping signal is sometimes referred to as a "speed lag voltage with wipe-out."

When a positional error occurs between controlled member 12 and control member 13, an error signal is applied to the balanced demodulator which produces a unidirectional voltage including both error and error rate components. This voltage is used to differentially adjust the potential of the cathodes of a pair of tubes arranged in the balanced mixer amplifier circuit. The velocity damping voltage from the armature circuit of motor 11 is applied to differentially vary the potential of the grids of these tubes according to the velocity of the motor 11. The mixer amplifier tubes 61 and 62 are biased to a point on the linear portion of the characteristic curves so their respective space currents depend upon the algebraic difference between the differential voltages applied to their respective cathodes and grids.

By this arrangement the difference between the space currents in the tubes 61 and 62 is proportional to the algebraic difference between the differential voltage applied to the cathodes and the differential voltage applied to the grids. This difference in the space currents controls the power amplifier circuit including the tubes 85 and 86 to vary the currents in opposed field windings 87 and 88 for causing the generator 89 to develop a voltage for driving the motor 11 at a speed which is substantially proportional to the algegraic difference (or sum as the case may be) of the composite error and error rate signal and the velocity damping signal to move the control member 12 in a direction to reduce the positional control error. Obviously, the rate at which this error is reduced depends upon the error, error rate, and velocity of the motor 11.

The unidirectional mixer amplifier and the power amplifier circuits are both balanced with respect to ground which is desirable in the case of motor control circuit. A single balanced circuit stage provides an amplified output signal that is substantially proportional to the algebraic difference (or sum) of the two control signals. Although this motor control circuit is shown in a positional control system, it is contemplated it may be used in any motor control circuit where it is desired to operate a motor according to a combination of two separate control signals.

Since the input impedance to the cathodes of the mixer amplifier circuit is relatively small, the mixer amplifier is preferably used with a signal from a high impedance source applied to its grids and one from a lower impedance source applied to its cathode. In some instances it may be desirable to control a motor by signals from two high impedance sources. For this purpose the motor control circuit shown in Fig. 2 may be used to provide high impedance inputs for both control signals. The positional control system shown in Fig. 2 includes controlled and control members 121 and 122 which are coupled by shafts to the rotor windings of synchro-transformers 123 and 124 respectively. The rotor winding of the transformer 124 is energized from a suitable alternating voltage source 125 whereas the positional error voltage from the rotor winding of transformer 123 is coupled by transformer 126 to be applied in like phase to the grids of demodulator tubes 127 and 128 arranged in a balanced demodulator circuit similar to that shown in Fig. 1.

This balanced demodulator operates in the same manner as shown in Fig. 1 to provide unidirectional voltages across load resistors 131 and 132 which are balanced with respect to a central point 133. As explained in connection with Fig. 1, these unidirectional voltages include components dependent upon the displacement between the controlled and control objects 121 and 122 as well as the rate of change of this displacement. The differential voltage which corresponds to a composite error and error rate signal is applied through resistors 135 and 136 across an error integrating circuit composed of resistor 137, condenser 138 and resistor 139 which adds a third component corresponding to the displacement error integral. Integrating circuits of this type have a relatively high impedance and are preferably connected to a comparable high impedance input circuit.

According to this feature of the invention, a high impedance input circuit for the demodulator mixer is formed by applying the composite error, error rate and integral signal differentially to grids 141 and 142 of tubes 143 and 144 that are connected in a balanced cathode follower circuit with their respective cathodes 146 and 147 connected through cathode resistors 148 and 149 to ground. The grids 141 and 142 are likewise balanced by connection through resistors 151 and 152 to ground. Plates 154 and 155 of the cathode follower tubes 143 and 144 may be connected to a suitable source 156, 156' of positive potential. In circuits of this type the voltage differential across cathode resistors 148 and 149 varies substantially proportionately to the voltage differential applied to the grids of the tubes. Hence, the voltage of cathodes 146 and 147 varies according to the composite error, error rate and integral signal.

These cathodes are connected directly to cathodes 161 and 162 of mixer amplifier tubes 163 and 164 that are arranged in a balanced circuit with their anodes connected through load resistors 165 and 166 to a selected point on voltage divider 167 across a source 168 of positive potential and ground. Cathodes 161 and 162 are connected through cathode resistors 171 and 172 at an appropriate point on voltage divider 167 as determined by the position of slider 173 to bias the mixer amplifier tubes 163 and 164 to operate on a linear portion of their respective mutual characteristic curves.

A speed voltage signal is developed in a manner to be described and applied by leads 175 and 176 differentially across grid resistors 177 and 178 to grids 179 and 181 of the mixer amplifier tubes 163 and 164, respectively. As was described in connection with Fig. 1, the difference between the space currents in the mixer amplifier tubes is substantially proportional to the algebraic difference between the differential voltages applied to the cathodes and grids of these tubes. Hence, the output voltage appearing across resistors 165 and 166 is substantially proportional to the difference between the composite error, error rate and integral signal applied to the mixer amplifier tubes and the speed or velocity voltage applied to the grid of these tubes. This voltage controls the current drawn by power amplifier tubes 183 and 184 which are connected to the source 168 through opposed field windings 185 and 186 of generator 187 having its armature 188 driven from a constant speed motor 189. The voltage output of the generator is applied by leads 191 and 192 to armature 193 of motor 194 that has a constantly excited field winding 195. Thus, the motor 194 is driven at a speed dependent upon the difference between the composite error signal and the velocity signal. The velocity signal is developed by a suitable generator 196 which may be of the permanent magnet type to produce a voltage proportional to the velocity of the motor 194 which positions the controlled object 121. This velocity voltage is applied across a potentiometer 198 having its slider 199 positioned to pick off a portion of the velocity voltage which may be applied to the grids 179 and 181 to be mixed with the composite error voltage applied to cathodes 161 and 162 of the mixer amplifier tubes.

When the controlled object 121 is positionally displaced with respect to the control member 122, an error voltage is developed by a synchro-transformer 123 which is applied to a balanced demodulator including tubes 127 and 128 for producing a unidirectional output voltage dependent upon the displacement error as well as the rate of change thereof. This error voltage is applied across an integrating circuit to add an error integral component to provide a composite control signal having error, error rate and error integral components. This composite control signal is applied to the grids of a balanced cathode follower circuit, the output of which controls the potential of the cathodes in a mixer amplifier circuit having the potential of their grids controlled according to the velocity of the motor which positions the controlled object. The cathode and grid circuits of the balanced mixer amplifier are connected to a source of potential to bias the tubes in a manner to operate on a linear portion of their respective characteristic curves whereby the difference between the space currents in these tubes is substantially proportional to the algebraic difference between the differential voltage applied to the cathodes and the differential voltage applied to their grids. This space current controls the fields of the generator which in turn applies a corresponding voltage to control the speed of the motor which positions the controlled object. Although Fig. 2 shows the mixer amplifier in connection with a positional control circuit it will be apparent that it may be used in any motor control circuit for combining two signals to jointly control the operation of the motor. As previously pointed out, this circuit has the particular advantage that it provides high impedance input circuits for both control signals.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a servo motor control system, a mixer amplifier for combining two control signals to jointly control operation of said motor, said amplifier comprising an electron discharge device including a cathode, an anode and a control electrode, a first control signal source external to the plate-cathode circuit of said device, means for applying said first control signal to control the potential of said cathode, a second control signal source, means for applying said second control signal to control the potential of said control electrode, and means providing a potential between said cathode and said control electrode for biasing said device to normally operate in a manner such that the space current in said tube is substantially proportional to the algebraic difference of said signals.

2. In a servo motor control system, a mixer amplifier for combining two control signals to jointly control operation of a motor, said amplifier comprising an electron discharge device including a cathode, an anode and a control electrode, a first impedance connected to said cathode, a first control signal voltage source external to the plate-cathode circuit of said device, means for applying said first control signal across said first impedance to control the potential of said cathode, a second impedance connected to said control electrode, a second signal source, means for applying said second control signal across said second impedance to control the potential of said control electrode, said impedances being connected to a source of potential in a manner such that the space current in said discharge device is substantially proportional to the algebraic difference of said signals.

3. In a servo motor control system, a mixer amplifier for combining two control signals to jointly control operation of said motor and comprising a pair of electron discharge devices arranged in a balanced circuit and each including plate, cathode and control electrode elements, a first source of signal voltage, means for applying said first control signal in opposite polarity sense to the control electrodes of said devices to control the potentials thereof, a second signal voltage source external to the plate-cathode circuits of said devices, means for applying said second control signal in opposite polarity sense to the cathodes of said devices to control the potentials thereof, said devices being connected in a manner such that the space currents thereof are varied substantially proportional to the algebraic difference of said signals.

4. In a servo motor control system, a mixer amplifier for combining two control signals to jointly control operation of said motor comprising a pair of electron discharge devices arranged in a balanced circuit and each including plate, cathode and control electrode elements, a first source of signal voltage, means for applying said first control signal in opposite polarity sense and differentially to the control electrodes of said devices to control the potentials thereof, a second source of control signal voltage external to the plate-cathode circuits of said devices, means for applying said second control signal in opposite polarity sense and differentially to the cathodes of said devices to control the potentials thereof, said devices being so constructed, connected and biased that the difference between space currents therein is substantially proportional to the algebraic difference between said two signals.

5. In a servo motor control system, a mixer amplifier circuit for combining two control signals to jointly control operation of said motor comprising a pair of electron discharge devices arranged in a balanced circuit, each of said devices including a cathode, an anode and a control electrode, a first source of control signal voltage, means for controlling the potential difference between the control electrodes of said tubes by applying said first control signal thereto in opposite polarity sense, a second source of control signal voltage external to the anode-cathode circuits of said devices, means for controlling the potential difference between the cathodes of said tubes by applying said second control signal thereto in opposite polarity sense, and means providing a bias potential between the cathodes and control electrodes of each of said tubes for normally operating said tubes at a point on their respective mutual characteristic curves in a manner such that the space current of each of said tubes varies substantially proportionately to the algebraic difference of said signals.

6. In a servo motor control system, a mixer amplifier for combining two control signals to jointly control operation of said motor comprising a pair of electron discharge devices each including a cathode, a control electrode and an anode, said devices being arranged in a balanced circuit including a first impedance means connected between the cathodes and a second impedance means connected between the control electrodes of said devices, a first source of control signal voltage external to the anode-cathode circuits of said devices, means for developing a potential across said first impedance means to vary the potential difference between said cathodes by applying said first control signal thereto in opposite polarity sense, a second source of control signal voltage, and means for developing a potential across said second impedance means for controlling the potential difference of said control electrodes by applying said second control signal thereto in opposite polarity sense, said first and second impedance means being connected to a potential source to normally bias said devices in a manner such that the space current of each of said tubes varies substantially proportionately to the algebraic difference of said signals.

7. In a servo motor control system, a mixer amplifier for combining two control signals to jointly control operation of said motor comprising a first electron discharge device including a cathode, a control electrode and an anode, a second electron discharge device including a cathode, a control electrode and an anode, a first source of control signal voltage external to the anode-cathode circuits of said devices, means for developing a potential across an impedance connected between said cathodes to control the potential differences of said cathodes by applying said first control signal thereto in opposite polarity sense, a second source of control signal voltage, means for developing a potential across an impedance connected between said control electrodes to control the potential difference between said control electrodes by applying said second control signal thereto in opposite polarity sense, said impedances having their center points connected to bias said devices in a manner such that the difference between the space currents of said device is substantially proportional to the algebraic difference between said control signals.

8. A motor control circuit for controlling the operation of a motor jointly by two control signals comprising a first signal means responsive to a first condition for producing a first control signal, second signal means responsive to a second condition for producing a second control signal, a balanced mixer amplifier circuit including a pair of electron discharge devices having their cathodes connected to one of said means to control the potential difference between said cathodes according to one of said signals and their control electrodes connected to the other of said means for controlling the potential difference between said control electrodes according to the other of said signals, the signal means connected to said cathodes being external to the plate-cathode circuits of said devices and said cathodes and control electrodes being interconnected in a manner such that the difference between the space currents of said devices is substantially proportional to the algebraic difference between said control signals, a motor, and an output circuit connecting said devices in controlling relation to said motor whereby to control said motor in accordance with the difference between the space currents of said devices.

9. In a positional control system, a motor control circuit comprising a transmission system for producing an error signal according to a positional error between a controlled member and a control member, a motor for positioning said controlled member, means operated by said motor for producing a speed signal, a mixer-amplifier circuit including a pair of electron discharge devices connected in a balanced circuit, means responsive to one of said signals for controlling the potential of the cathodes of said devices, means responsive to the other of said signals for controlling the potential of the grids of said devices, said devices being biased in a manner such that their space currents are substantially proportional to the algebraic difference of said signals, and means responsive to the space currents of said devices for actuating said motor to reduce said positional error.

10. In a positional control system, a motor control circuit comprising means for producing an error signal proportional to the positional error between a controlled member and a control member, a motor for positioning said controlled member, an amplifier circuit including a pair of electron discharge devices connected in a balanced circuit, means responsive to said error signal for controlling the potential of the cathodes of said devices, means operated by said motor for controlling the potential of the grids of said devices, said devices being biased in a manner such that the difference between their space currents is substantially proportional to the algebraic difference of said signals, and means connected to said devices responsive to the difference in said space currents for actuating said motor to reduce said positional error.

11. In a positional control system, a motor control circuit comprising a transmission system for producing a reversible phase variable magnitude error voltage dependent upon the direction and magnitude of a positional error between a controlled member and a control member, a balanced demodulator circuit connected to said transmission system for converting said error voltage into a unidirectional voltage of a polarity dependent upon the phase of said error voltage, a motor for positioning said controlled member, means connected to said motor for producing a unidirectional voltage dependent upon the speed thereof, a mixer-amplifier circuit having a pair of electron discharge devices arranged in a balanced circuit, means for applying one of said unidirectional voltages to the cathodes of said devices, means for applying the other of said unidirectional voltages to the control electrodes of said devices, said devices being biased in a manner such that the difference between their space currents is substantially proportional to the algebraic difference of said signals, the output circuit of said amplifier circuit including means for controlling the direction and rate of operation of said motor.

12. In a servo motor control system, a mixer amplifier for combining two control signals to jointly control operation of said motor comprising a pair of electron discharge devices arranged in a balanced circuit, each of said devices including a cathode, a control electrode and an anode, a first control signal voltage source external to the anode-cathode circuits of said devices, a balanced cathode follower circuit for controlling the potential of the cathodes of said devices according to said first control signal, a second control signal voltage source, and means for applying said second control signal to the control electrodes of said devices, said devices being connected in a manner such that the space currents thereof are varied substantially proportionately to the algebraic difference of said signals.

13. In a servo motor control system for controlling the operation of a motor in response to two control signals, a first and second signal source, an amplifier comprising a first pair of electron discharge devices arranged in a balanced cathode follower circuit, means for controlling the potentials of their respective cathodes according to said first control signal, a second pair of electron discharge devices arranged in a balanced mixer-amplifier circuit, the cathodes of said second pair of devices being connected to the cathodes of said first pair of devices for controlling the potentials thereof according to said first signal, means for applying the second control signal to the control electrodes of said second pair of electron discharge devices, said first signal source being external to said mixer amplifier circuit and said second pair of electron discharge devices being biased in a manner such that the space currents thereof are varied according to the algebraic difference between said control signals, a motor, and means responsive to the space currents of said second pair of electron discharge devices for controlling said motor in accordance with the combination of said two signals.

14. In a servo motor control system for controlling the operation of a motor in response to two control signals, a first and second signal source, an amplifier comprising a first pair of electron discharge devices arranged in a balanced cathode follower circuit, means for applying said first signal to the control grid of said devices to differentially vary the potentials of their cathodes according to said signal, a second pair of electron discharge devices arranged in a balanced mixer-amplifier circuit, the cathodes of said second paid of devices being connected to the cathodes of said first pair for differentially varying the potentials thereof in correspondence with variations in said first control signal, means responsive to the second control signal for differentially varying the potential of the control electrodes of said second pair of electron discharge devices, said first signal source being external to said mixer amplifier circuit and said second pair of electron discharge devices being biased in a manner such that the space currents thereof are varied according to the algebraic difference between said control signals, a motor, and means responsive to said difference between the space currents of said second pair of electron discharge devices for controlling said motor.

RAWLEY D. McCOY.

REFERENCES CITED

The following references are of record in the file of this patent:

UNITED STATES PATENTS

| Number | Name | Date |
| --- | --- | --- |
| Re. 16,667 | Hewlett et al. | July 5, 1927 |
| 1,944,756 | Quarles | Jan. 23, 1934 |
| 2,061,416 | Blume | Nov. 17, 1936 |
| 2,113,436 | Williams | Apr. 5, 1938 |
| 2,115,086 | Riggs | Apr. 26, 1938 |
| 2,131,759 | Satterlee | Oct. 4, 1938 |
| 2,147,674 | Satterlee | Feb. 21, 1939 |
| 2,236,086 | Conover | Mar. 25, 1941 |
| 2,296,107 | Kimball | Sept. 15, 1942 |
| 2,399,695 | Satterlee | May 7, 1946 |